Figure 1:
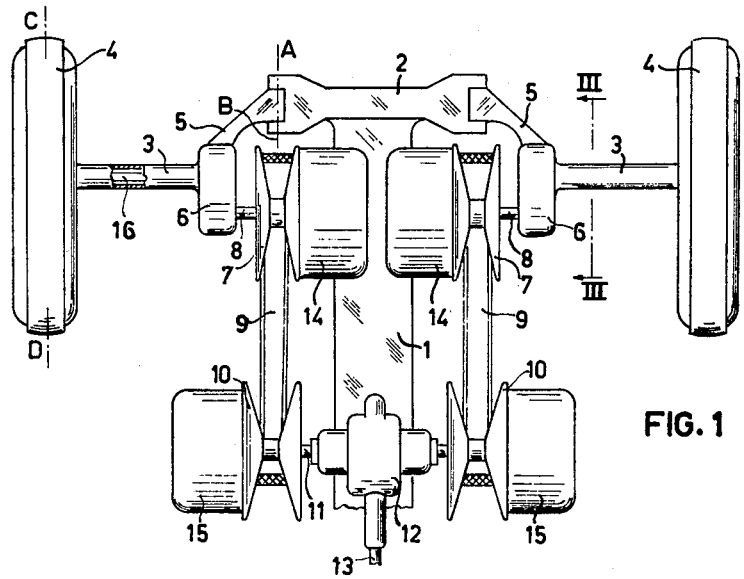

April 18, 1961   J. VAN DER BRUGGHEN   2,980,196
MOTOR VEHICLE PROVIDED WITH SWINGING AXLES
Filed Jan. 12, 1959

Joan VAN DER BRUGGHEN
*INVENTOR.*

BY:
Wenderoth, Lind & Ponack
Attys

United States Patent Office 2,980,196
Patented Apr. 18, 1961

2,980,196
MOTOR VEHICLE PROVIDED WITH SWINGING AXLES

Joan van der Brugghen, Eindhoven, Netherlands, assignor to Van Doorne's Automobielfabriek N.V., Eindhoven, Netherlands, a Netherlands limited liability company Filed Jan. 12, 1959, Ser. No. 786,302
Claims priority, application Netherlands Jan. 16, 1958
3 Claims. (Cl. 180—73)

The invention relates to a motor vehicle provided with two driven wheels arranged on swinging axles and has the purpose to provide a drive for a motor vehicle of this kind so that important advantages are obtained.

According to this purpose of the invention a reduction gear in the drive of each wheel is arranged in a gear casing which casing is rigidly connected to the swinging axle and is nearer to the pivot axis of the swinging axle than to the radial central plane of the wheel.

Motor vehicles with a rigid axle are known, in which immediately near the wheel a reduction gear is arranged the casing of which is rigidly connected to the rigid axle. If a such-like construction would be applied to a vehicle with swinging axles, the non-sprung part would be considerably heavier which would have the drawback of a lesser roadability.

This drawback is removed by the invention in that the reduction gear casing may be arranged so near the axis of the swinging axle that the weight of the gear casing is supported chiefly by the sprung part of the vehicle. The advantage of the reduction gear applies especially to two cases.

If a vehicle is driven by belts and the shaft of the driven pulley is connected to the small pinion of the reduction gear, and the shaft which drives the road wheel is connected to the large gear wheel of the reduction gear, the number of revolutions of the pulley is greater than the number of revolutions of the road wheel, so that the belt is less stressed than if the pulley would be connected immediately to the shaft of the road wheel. In this way the life of the belt is considerably lengthened.

If the swinging axles are driven from a differential housing via universal joints, the reduction gear has the advantage that the shaft on which the universal joints at each side of the vehicle are arranged, rotates quicker than the shaft of the road wheel so that this shaft and the universal joint may be of a lighter construction and moreover the universal joint is less stressed.

According to the invention the motor vehicle may be executed in such a way that the driven shaft extending from the reduction gear and connected to the road wheel, is lower than the driving shaft of the reduction gear.

In this way the road clearance of the vehicle is larger which when applying a belt drive has the advantage that pulleys of a larger diameter may be used. A large diameter of the pulleys results in a great speed of the belt and the radius of curvature is also large, both factors resulting in a lesser stretch of the belt. In the second of both mentioned cases the shaft of the universal joint is located higher than the wheel axles, so that when using small road wheels a sufficient road clearance is obtained.

If an automatic variator with axially extensible pulleys is used, the motor vehicle according to the invention may be executed in such a way that an automatic adjusting device is arranged at that side of the driven pulley which is opposite to the side where the reduction gear casing is connected to the pulley. In this way the advantage is obtained that the reduction gear casing may be arranged close to the driven pulley and the mass consisting of the reduction gear casing, the pulley and the adjusting device is concentrated as much as possible. A very efficient construction is obtained if in this case the axis about which the swinging axle swings, lies about in the central radial plane of the driven pulley, as will appear from the following description of an embodiment.

Where in the above is mentioned that the reduction gear casing is nearer to the axis about which the axle swings than to the radial central plane of the road wheel, it is also understood that the distance from the middle of the reduction gear casing to the said axis will be zero that is to say it coincides with the said axis. In that case the up and down movements of the road wheel cause the reduction gear casing to make only a wobbling movement and hence the weight of the reduction gear casing and the gear wheels arranged therein, is entirely carried by the sprung part of the vehicle.

Figure 2:
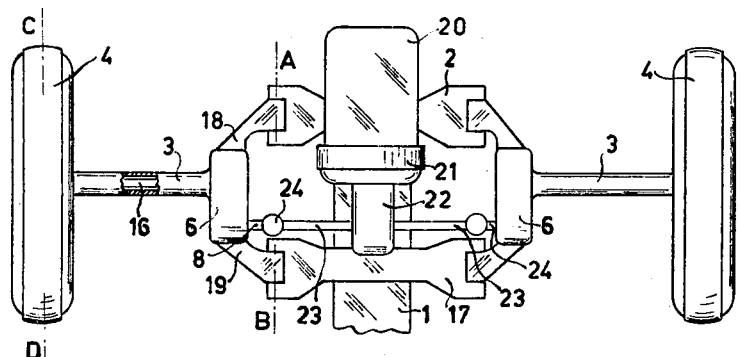
Figure 3:
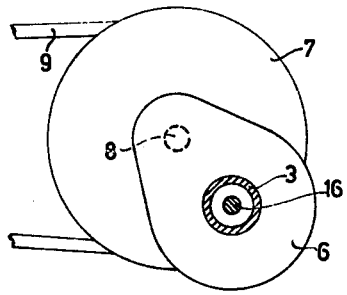

The drawing shows two embodiments of the driving part of a motor vehicle according to the invention. In this drawing:

Fig. 1 is a plan view of the rear portion of a motor vehicle which is supported by swinging axles and which is driven by means of belts, Fig. 2 is a corresponding plan view of a different embodiment in which the road wheels are driven from a gear box by means of shafts with universal joints, and Fig. 3 is a section at a larger scale according to the line III—III in Fig. 1.

The vehicle which is schematically shown in Fig. 1 comprises a central main beam 1 to which a cross beam 2 is fastened. Swinging axles 3 are adapted to swing about axes A—B at the ends of the cross beam 2, the ends of said swinging axles carrying the rotatable road wheels 4. Each swinging axle consists of a bracket 5 which is adapted to swing in the cross beam 2 of a reduction gear casing 6, and of the housing of the swinging axle 3, said parts forming one rigid unit. The swinging movement of the axle 3 is imparted to the driven extensible pulley 7 of an automatic variator of the type disclosed in copending application, Serial No. 786,296 filed January 12, 1959, and assigned to the assignee of this application, which pulley is connected by a shaft 8 to a pinion in the reduction gear casing 6. The pulley 7 is connected by a belt 9 to a second extensible pulley 10 which by a shaft 11 is driven from a reversing gear 12. The drive takes place by means of a main shaft 13 which is driven by the engine of the vehicle, so that the pulley 10 is the driving pulley of the automatic variator. A mechanism for automatically adjusting the pulleys is located in drums 14 and 15 which are connected to the pulleys 7 and 10 respectively. Since the automatic adjusting device does not constitute a part of the invention it will not be described further.

A shaft 8 between the pulley 7 and the pinion in the reduction gear casing 6 is the primary shaft of the reduction gear while a shaft 16 is rotatable within the housing of the swinging axle 3, said shaft 16 being connected to the large gear wheel of the reduction gear and thus is the secondary shaft of this reduction gear.

It appears from the drawing that the reduction gear casing 6 is nearer to the axis A—B than to the radial central plane C—D of the road wheel 4. During the swinging movement of the axle 3 the up and down movement of the reduction gear casing 6 is much smaller than that of the road wheel 4, so that the mass of the reduction gear and its casing 6 is chiefly carried by the suspended portion of the vehicle. By the arrangement of the reduction gear the number of revolutions of the primary shaft 8 is much greater than that of the secondary shaft 16 so that the advantage is obtained which is mentioned in the introductory part of this description.

In the embodiment according to Fig. 2 the central main beam 1 carries two cross beams 2 and 17 and the reduction gear casing 6 has two brackets 18 and 19 which are supported in the cross beams 2 and 17 respectively, so that the axle 3 is adapted to swing about the axis A—B. The vehicle is driven by an engine 20 which via a clutch 21 is connected to a gear box 22 which comprises the speeds and a differential gear. From this differential gear two shafts 23 extend in lateral direction. Each shaft 23 is via a universal joint 24 connected to the primary shaft 8 of the reduction gear which is located in the casing 6, while the secondary shaft 16 is connected to the road wheel 4.

Just like in the first embodiment the reduction gear casing 6 is nearer to the axis A—B than to the radial central plane C—D of the road wheel 4. By the fact that the primary shaft 8 makes more revolutions than the secondary shaft 16 of the reduction gear, the universal joints 24 are little stressed and may be of light construction.

It is of advantage if the secondary shaft 16 of the reduction gear is lower than the primary shaft 8, which applies to both embodiments. In this connection reference is made to Fig. 3 which shows a section according to the line III—III in Fig. 1, however, at a larger scale. In this figure the housing of the swinging axle 3 and the secondary shaft 16 are drawn in section while the reduction gear casing 6, the pulley 7 and the belt 9 are shown in side view. The advantages of this construction have been mentioned in the introductory part of this description.

What is claimed is:

1. Means for driving a motor vehicle comprising a driving shaft, a stationary driving pulley located at each side of the longitudinal central plane of the vehicle driven by said driving shaft, a driven pulley located at each side of the longitudinal central plane of the vehicle, a belt extending over a driving pulley and a driven pulley on each side of the longitudinal central plane of the vehicle for driving the driven pulley, two swinging half axles each swivelling about a separate axis located at each side of the longitudinal central plane of the vehicle, a casing containing a reduction gear having an input shaft enclosed in said casing, said input shaft being driven by a driven pulley, a road wheel mounted upon each of said half axles and said reduction gear being located closer to the swiveling axis than to said road wheel.

2. Means for driving a motor vehicle comprising a driving shaft, a stationary driving pulley located at each side of the longitudinal central plane of the vehicle driven by said driving shaft, a driven pulley located at each side of the longitudinal central plane of the vehicle, a belt extending over a driving pulley and a driven pulley on each side of the longitudinal central plane of the vehicle for driving the driven pulley, two swinging half axles each swivelling about a separate horizontal axis located at each side of the longitudinal central plane of the vehicle substantially parallel to said plane, a casing containing a reduction gear having an input shaft enclosed in said casing, said input shaft being driven by a driven pulley, a road wheel mounted upon each of said half axles and said reduction gear being located closer to the swiveling axis than to said road wheel.

3. Means for driving a motor vehicle comprising a driving shaft, a stationary driving pulley located at each side of the longitudinal central plane of the vehicle driven by said driving shaft, a driven pulley located at each side of the longitudinal central plane of the vehicle, a belt extending over a driving pulley and a driven pulley on each side of the longitudinal central plane of the vehicle for driving the driven pulley, two swinging half axles each swivelling about a separate axis located at each side of the longitudinal central plane of the vehicle, a casing containing a reduction gear having an input shaft enclosed in said casing, said input shaft being driven by a driven pulley, a road wheel mounted upon each of said half axles and said reduction gear being located closer to the swiveling axis than to said road wheel and an automatic adjusting device connected with that side of the pulley which is opposite to the side where said reduction gear casing is connected with the pulley and in immediate proximity thereof.

References Cited in the file of this patent

UNITED STATES PATENTS

| | | |
|---|---|---|
| 1,273,412 | Salsbury | July 23, 1918 |
| 1,920,175 | Hollos | Aug. 1, 1933 |
| 2,007,670 | Zubaty | July 9, 1935 |
| 2,145,183 | Ledwinka | Jan. 24, 1939 |
| 2,196,556 | Hollos | Apr. 9, 1940 |
| 2,570,191 | Beckwith | Oct. 9, 1951 |